US012183145B2

(12) United States Patent
Miyashima

(10) Patent No.: US 12,183,145 B2
(45) Date of Patent: Dec. 31, 2024

(54) CHECKOUT APPARATUS

(71) Applicant: TOSHIBA TEC KABUSHIKI KAISHA, Tokyo (JP)

(72) Inventor: Atsushi Miyashima, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/307,026

(22) Filed: Apr. 26, 2023

(65) Prior Publication Data

US 2024/0013605 A1 Jan. 11, 2024

(30) Foreign Application Priority Data

Jul. 6, 2022 (JP) ................................ 2022-108851

(51) Int. Cl.

*G07D 11/40* (2019.01)
*G07D 1/06* (2006.01)
*G07D 11/14* (2019.01)

(52) U.S. Cl.

CPC ............... *G07D 11/40* (2019.01); *G07D 1/06* (2013.01); *G07D 11/14* (2019.01); *G07D 2201/00* (2013.01); *G07D 2211/00* (2013.01)

(58) Field of Classification Search

CPC .......... G07D 11/40; G07D 1/06; G07D 11/14; G07D 2201/00; G07D 2211/00; G07D 9/00

See application file for complete search history.

(56) References Cited

FOREIGN PATENT DOCUMENTS

| | | | | |
|---|---|---|---|---|
| JP | 2014-157586 | | | 8/2014 |
| JP | 2016173769 | A | * | 9/2016 |
| JP | 2017138888 | A | * | 8/2017 |
| JP | 2020035494 | A | * | 3/2020 |

* cited by examiner

*Primary Examiner* — Sonji N Johnson

(74) *Attorney, Agent, or Firm* — Amin, Turocy & Watson, LLP

(57) ABSTRACT

A checkout apparatus according to an embodiment includes a housing, a bill change machine housed in the housing to be capable of being drawn out from the housing, a coin change machine housed in the housing to be capable of being drawn out from the housing in a same direction as a direction in which the bill change machine is drawn out, and a lock unit configured to, if the bill change machine was drawn out, lock the coin change machine to be unable to be drawn out and, if the coin change machine was drawn out, lock the bill change machine to be unable to be drawn out.

14 Claims, 13 Drawing Sheets

CHECKOUT APPARATUS

CROSS-REFERENCE TO RELATED APPLICATION

This application is based upon and claims the benefit of priority from Japanese Patent Application No. 2022-108851, filed on Jul. 6, 2022, the entire contents of which are incorporated herein by reference.

FIELD

Embodiments described herein relate generally to a checkout apparatus, a semi-self-service point of sales terminal, and methods related thereto.

BACKGROUND

Recently, in a store such as a supermarket or a convenience store, a self-service type checkout system including a checkout apparatus is sometimes used. In the case of the self-service type checkout system, a customer operates the checkout apparatus installed in the store and performs commodity registration operation and checkout operation relating to a commodity to be purchased. The checkout apparatus performs commodity registration processing and checkout processing.

Some store uses a semi-self-service type checkout system including a commodity registration apparatus and a checkout apparatus. In the case of the semi-self-service type checkout system, a store clerk of the store performs registration operation in the commodity registration apparatus and a customer performs checkout operation in the checkout apparatus. The checkout apparatus performs checkout processing.

Such a checkout apparatus has a function of dispensing change to a customer who performs checkout by cash. Therefore, the checkout apparatus incorporates a bill change machine that dispenses bill change and a coin change machine that dispenses coin change.

The bill change machine stores, as change, a considerable amount of bills to be dispensed to customers. The coin change machine stores, as change, a considerable amount of coins to be dispensed to customers. Consequently, the bill change machine and the coin change machine have considerably large weights because the weights of the stored bills and coins are added to the weights of the bill change machine and the coin change machine. Further, since a customer operates the checkout machine, amounts of the stored bills and coins are increased in order to reduce the number of times of collection of the stored bills and coins and the number of times of supply of bills and coins to be stored. Therefore, the weights of the bill change machine and the coin change machine tend to further increase.

Incidentally, in the checkout apparatus, the bill change machine and the coin change machine are sometimes drawn out in the same direction (for example, the forward direction) for collection of bills and coins and periodical maintenance. If the bill change machine and the coin change machine are simultaneously drawn out, a weight balance of the checkout apparatus is collapsed (the center of gravity position of the checkout apparatus is deviated) by the weights of the bill change machine and the coin change machine and there is a risk that the checkout apparatus falls down in the direction in which the bill change machine and the coin change machine are drawn out.

DETAILED DESCRIPTION

Figure 1:
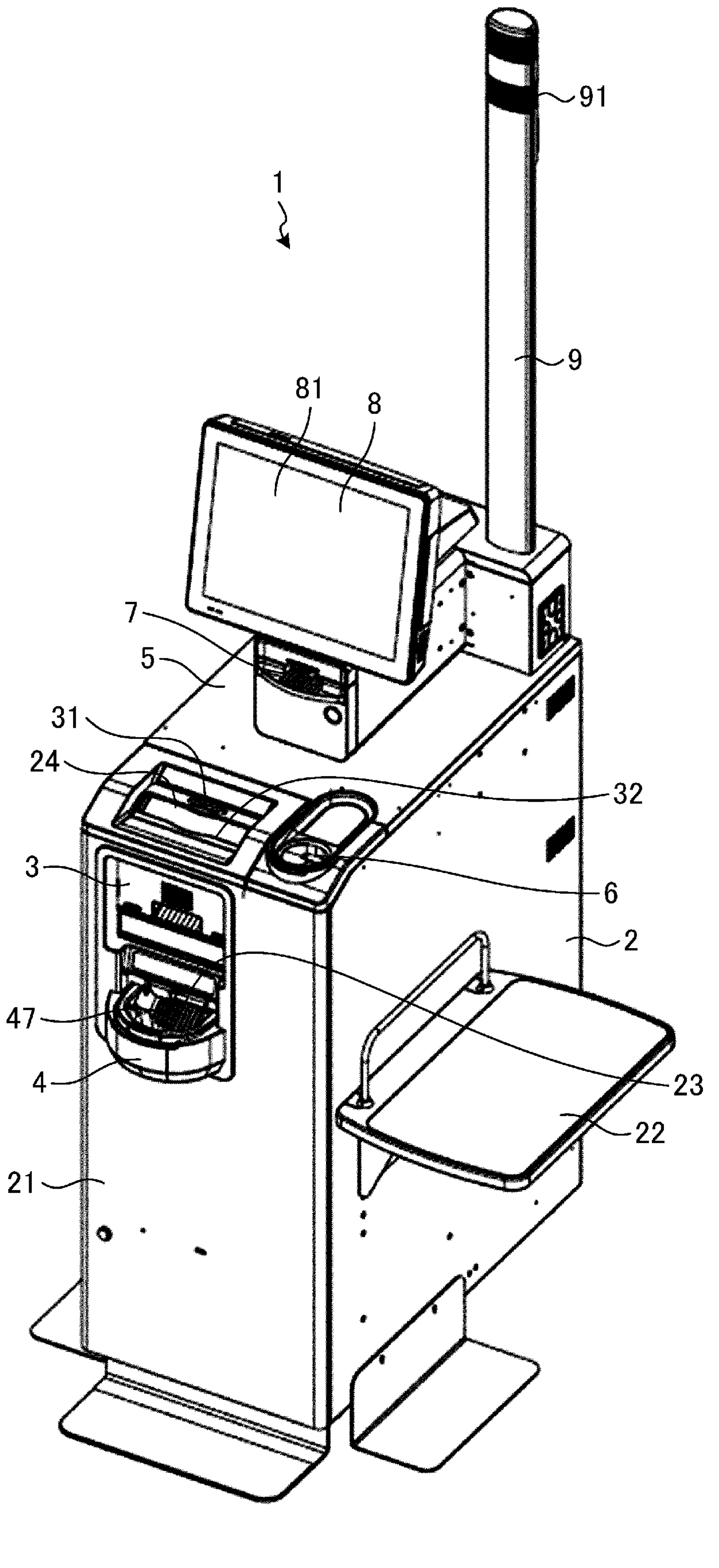
FIG. 1 is an exterior view of a checkout apparatus according to a first embodiment viewed from the oblique front.

An aspect of embodiments is to provide a checkout apparatus capable of reducing a risk of fall-down of the checkout apparatus at a maintenance time and the like.

A checkout apparatus according to an embodiment includes: a housing; a bill change machine housed in the housing to be capable of being drawn out from the housing; a coin change machine housed in the housing to be capable of being drawn out from the housing in a same direction as a direction in which the bill change machine is drawn out; and a lock unit configured to, if the bill change machine was drawn out, lock the coin change machine to be unable to be drawn out and, if the coin change machine was drawn out, lock the bill change machine to be unable to be drawn out. In another embodiment, a method for a checkout apparatus involves drawing out a bill change machine from an inside of a housing of the checkout apparatus; drawing out a coin change machine from the inside of the housing in a same direction as a direction in which the bill change machine is drawn out; if the bill change machine is drawn out, locking the coin change machine with a lock component so that the coin change machine is unable to be drawn out; and if the coin change machine is drawn out, locking the bill change machine with the lock component so that the bill change machine is unable to be drawn out.

First Embodiment

A first embodiment is explained below. A checkout apparatus according to the first embodiment is a checkout apparatus in a semi-self-service checkout apparatus (a POS (Point of Sales) terminal) installed in a store such as a supermarket, a convenience store, or a mass retailer. The semi-self-service checkout apparatus is used for commodity registration processing and checkout processing for commodities sold in the store. The semi-self-service checkout apparatus includes a commodity registration apparatus (not illustrated) and a checkout apparatus.

The commodity registration apparatus is operated by, for example, a store clerk and executes commodity registration processing for a commodity to be purchased by a customer. The commodity registration processing means processing for, for example, optically reading a code symbol or the like attached to the commodity to acquire commodity specifying information for specifying the commodity, displaying, on a display unit, a commodity name and a price (commodity information) of the commodity read based on the acquired commodity specifying information, and storing the commodity information.

The checkout apparatus is operated by the customer himself or herself and executes checkout processing. The checkout processing means, for example, processing for performing, based on the commodity information received from the commodity registration apparatus that performed the commodity registration processing, display of a total amount relating to a relevant transaction and settlement by cash or a medium such as a credit card, processing for calculating change based on deposited money in the case of the cash settlement and displaying the change, processing for instructing a change machine to dispense the change, and processing for dispensing, from a printing unit, a receipt on which the commodity information and checkout information (the total amount, a deposit amount, a change amount, and the like) are printed.

FIG. 1 is an exterior perspective view of a checkout apparatus 1 according to the first embodiment. The checkout apparatus 1 includes, for example, a substantially rectangular parallelepiped housing 2 that is vertically long and hollow. The checkout apparatus 1 includes, in a front part located to be operated by a customer, a door 21 for opening and closing the inside of the housing 2. The door 21 is turnably attached to the housing 2 and turns with one side thereof as an axis to open and close the inside of the housing 2.

The checkout apparatus 1 includes a power supply unit and a circuit board (both of which are not illustrated) in a lower part of the inside. The power supply unit supplies electric power to the checkout apparatus 1. The circuit board executes control processing for the checkout apparatus 1 explained below in a second embodiment.

The checkout apparatus 1 includes a coin change machine 4 above the power supply unit and the like and in substantially the center in the up-down direction of the housing 2. The coin change machine 4 stores, on the inside, coins to be paid as change. The coin change machine 4 can be drawn out forward (in an opening direction of the door 21) (slid forward) from the housing 2 in a state in which the door 21 is turned to open the inside. That is, in a state in which the door 21 is opened, the coin change machine 4 is capable of moving between a housing position where the coin change machine 4 is housed in the housing 2 and a drawing-out position where the coin change machine 4 is drawn out forward from the housing 2. The coin change machine 4 is drawn out from the housing 2 by an operator moving the coin change machine 4 in a drawing-out direction. The drawn-out coin change machine 4 can be pushed into the housing 2 (slid rearward). The coin change machine 4 is pushed in by the operator moving the coin change machine 4 in a direction in which the coin change machine 4 is pushed into the housing 2. The pushed-in coin change machine 4 is housed in the housing position on the inside of the housing 2.

The coin change machine 4 includes a tray 47 on the front side (a side operated by the customer). The tray 47 receives coins dispensed by the coin change machine 4 as change. In a state in which the door 21 is closed, the tray 47 is exposed in a state in which the tray 47 projects forward from an opening section 23 provided in the door 21 to be directed forward. The customer receives, as change, the coins dispensed to the tray 47.

The checkout apparatus 1 includes a bill change machine 3 above the coin change machine 4 and in an upper part position of the housing 2. That is, the bill change machine 3 and the coin change machine 4 are disposed in the up-down direction. The bill change machine 3 stores, on the inside, bills to be paid as change. The bill change machine 3 can be drawn out forward (in the opening direction of the door 21) (slid forward) from the housing 2 in the state in which the door 21 is turned to open the inside. That is, the bill change machine 3 becomes capable of moving between a housing position where the bill change machine 3 is housed in the housing 2 and a drawing-out position where the bill change machine 3 is drawn out forward from the housing 2 in a state in which the door 21 is opened. The bill change machine 3 is drawn out by the operator moving the bill change machine 3 in a direction in which the bill change machine 3 is drawn out. The drawn-out bill change machine 3 can be pushed into the housing 2 (slid rearward). The bill change machine 3 is pushed in by the operator moving the bill change machine 3 in a direction in which the bill change machine 3 is pushed into the housing 2. The pushed-in bill change machine 3 is housed on the inside of the housing 2. As explained in detail below, the bill change machine 3 and the coin change machine 4 cannot be simultaneously drawn out from the housing 2.

The bill change machine 3 includes a bill depositing port 31 and a bill receiving port 32 on the upper surface thereof. The bill depositing port 31 is a port for depositing bills as deposit money. The bills deposited to the bill depositing port 31 are stored in the bill change machine 3. The bill receiving port 32 receives bills dispensed by the bill change machine 3 as change. In the state in which the door 21 is closed, the bill depositing port 31 and the bill receiving port 32 are exposed in a state in which the bill depositing port 31 and the bill receiving port 32 face an opening section 24 provided to be directed upward in the door 21. The customer deposits bills from the bill depositing port 31 and receives, as change, bills dispensed to the bill receiving port 32.

The checkout apparatus 1 includes a coin depositing port 6 on an upper surface 5 of the housing 2. The coin depositing port 6 is a port for depositing coins as deposit money. The coins deposited to the coin depositing port 6 are stored in the coin change machine 4.

The checkout apparatus 1 includes a placing table 22 on a side surface of the housing 2. For example, a basket storing commodities subjected to commodity registration processing in the commodity registration apparatus is placed on the placing table 22. After the commodities in the basket are subjected to checkout processing in the checkout apparatus 1, the customer stores the commodities in a register bag or the like.

The checkout apparatus 1 includes a printing unit 7 and a display unit 8 substantially in the center of the upper surface 5 of the housing 2. The printing unit 7 is, for example, a thermal printer and dispenses a receipt on which commodity information and checkout information are printed. The display unit 8 is, for example, a liquid crystal display. The display unit 8 displays commodity information and checkout information in a transaction. An operation unit 81 is provided on the upper surface of the display unit 8. The operation unit 81 is, for example, a transparent touch panel and plays a role of a keyboard.

In the checkout apparatus 1, a pole 9 is provided in a rear position of the upper surface 5. The pole 9 extends upward. A light emitting unit 91 is provided at the upper end portion of the pole 9. The light emitting unit 91 is, for example, a rotary beacon light. If an abnormality or an accident occurs in the checkout apparatus 1, the light emitting unit 91 emits light or flashes to inform the abnormality or the accident to an attendant.

Figure 2:
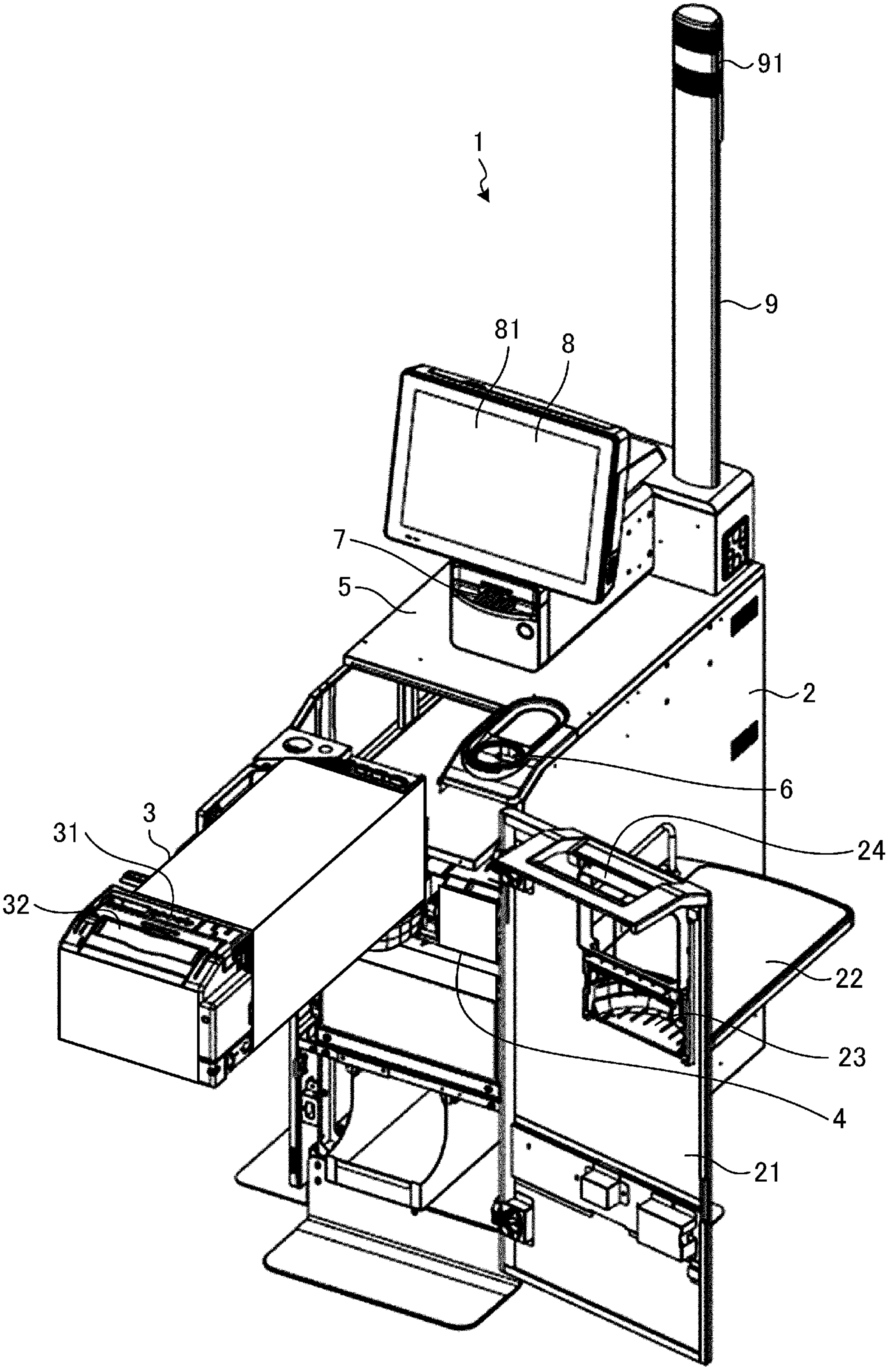
FIG. 2 is a diagram illustrating a state in which a door of the checkout apparatus is opened and a bill change machine is drawn out forward from a housing.

A configuration of the inside of the checkout apparatus 1 is explained below. FIG. 2 is a diagram illustrating a state in which the door 21 of the checkout apparatus 1 is opened and the bill change machine 3 is drawn out to the drawing-out position. In this state, the coin change machine 4 is locked in the housing position of the housing 2 and cannot be drawn out from the housing position. In this state, the operator performs maintenance work for the bill change machine 3 and performs, for example, collection work for bills stored on the inside of the bill change machine 3. At this time, the center of gravity of the checkout apparatus 1 moves forward (in the drawing-out direction) by a drawing-out distance of the bill change machine 3. However, the center of gravity does not excessively move because the coin change machine 4 is locked in the housing position of the housing 2. Therefore, it is possible to reduce a risk that the checkout apparatus 1 falls down forward compared with when the bill change machine 3 and the coin change machine 4 are simultaneously drawn out as in the related art.

Figure 3:
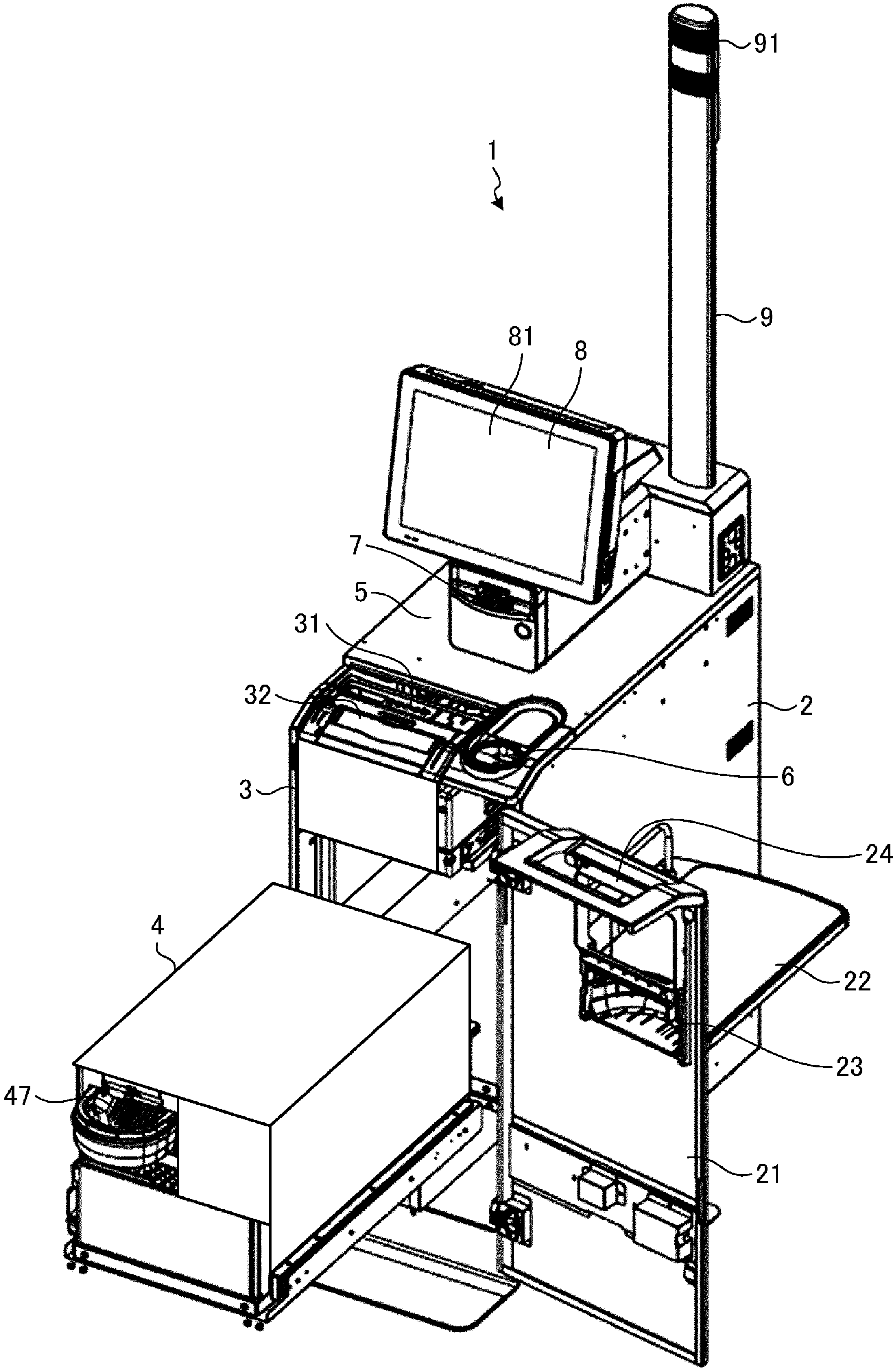
FIG. 3 is a diagram illustrating a state in which the door of the checkout apparatus is opened and a coin change machine is drawn out forward from the housing.

FIG. 3 is a diagram illustrating a state in which the door 21 of the checkout apparatus 1 is opened and the coin change machine 4 is drawn out to the drawing-out position. In this state, the bill change machine 3 is locked in the housing position of the housing 2 and cannot be drawn out from the housing position. In this state, the operator performs maintenance work for the coin change machine 4 and performs, for example, collection work for coins stored on the inside of the coin change machine 4. At this time, the center of gravity of the checkout apparatus 1 moves forward (in the drawing-out direction) by a drawing-out distance of the coin change machine 4. However, the center of gravity does not excessively move because the bill change machine 3 is locked in the housing position of the housing 2. Therefore, it is possible to reduce a risk that the checkout apparatus 1 falls down forward compared with when the bill change machine 3 and the coin change machine 4 are simultaneously drawn out as in the related art.

Figure 4:
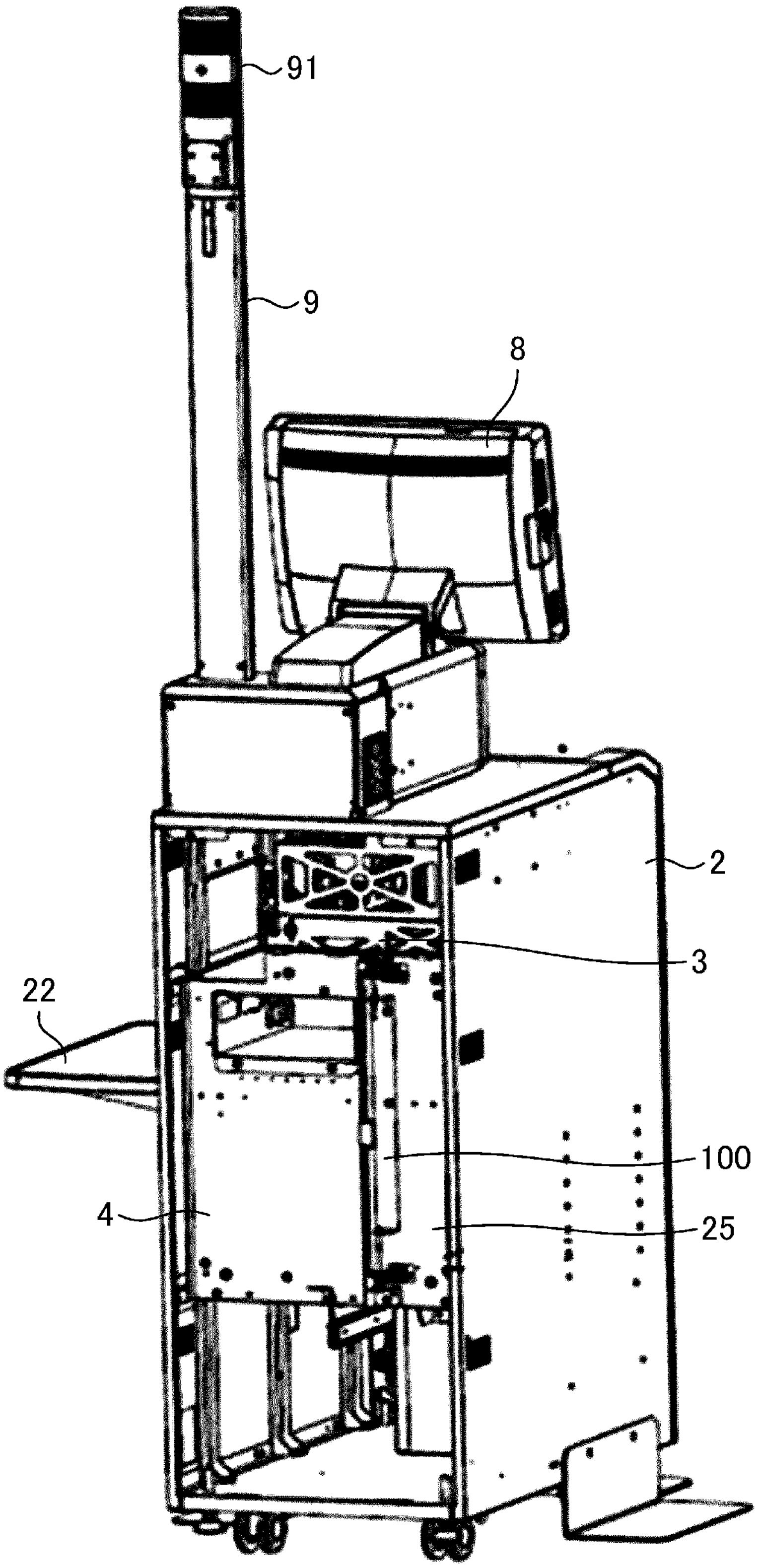
FIG. 4 is an exterior view of the checkout apparatus viewed from the oblique rear (the rear surface side)

FIG. 4 is an exterior view of the rear surface of the checkout apparatus 1 viewed from the oblique rear. In FIG. 4, both of the bill change machine 3 and the coin change machine 4 are located in the housing positions. A lock mechanism 100 (a lock unit) is attached to a rear surface section 25 (a surface on the opposite side of the front surface of the checkout apparatus 1) located on the rear side of the checkout apparatus 1. The lock mechanism 100 is a mechanism including a function of locking the coin change machine 4 in the housing position if the bill change machine 3 is drawn out from the housing position and locking the bill change machine 3 in the housing position if the coin change machine 4 is drawn out from the housing position. The lock mechanism 100 locks the coin change machine 4 in the housing position in a state in which the bill change machine 3 is slightly drawn out from the housing position (that is, a state in which the bill change machine 3 does not reach the drawing-out position) and locks the bill change machine 3 in the housing position in a state in which the coin change machine 4 is slightly drawn out from the housing position (that is, a state in which the coin change machine 4 does not reach the drawing-out position). The lock mechanism 100 is explained in detail with reference to FIGS. 5 to 8.

Figure 5:
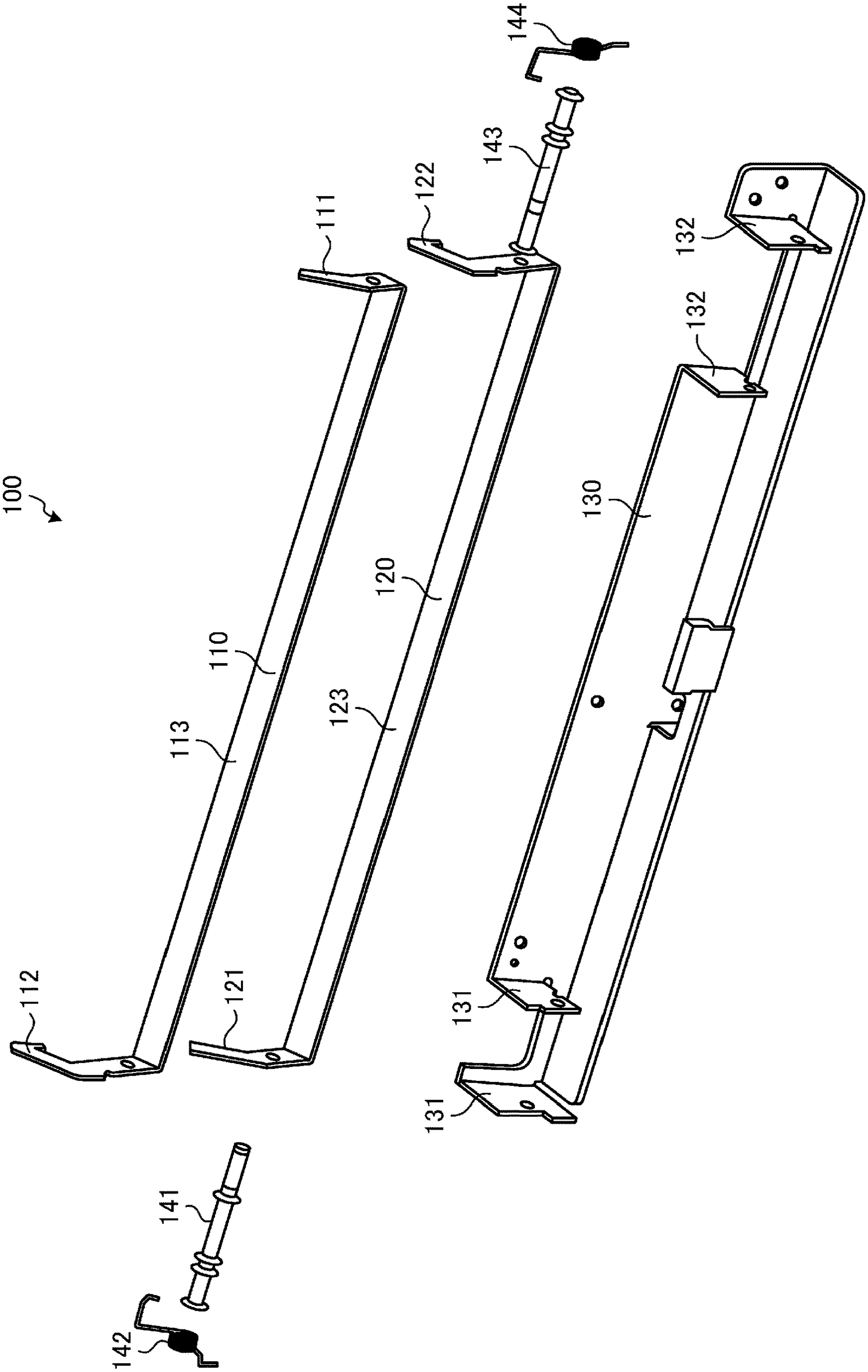
FIG. 5 is an exploded view of a lock mechanism.

FIG. 5 is an exploded view of the lock mechanism 100. In FIG. 5, the lock mechanism 100 includes a bill draw-out preventing mechanism 110 and a coin draw-out preventing mechanism 120. The lock mechanism 100 further includes a base 130. The bill draw-out preventing mechanism 110 is a member that inhibits the bill change machine 3 from being drawn out if the coin change machine 4 was drawn out. The coin draw-out preventing mechanism 120 is a member that inhibits the coin change machine 4 from being drawn out if the bill change machine 3 was drawn out. The base 130 is a member that supports the bill draw-out preventing mechanism 110 and the coin draw-out preventing mechanism 120 turnably on the same axis.

The bill draw-out preventing mechanism 110 is formed in a substantially C shape by a material such as metal, plastic, or resin. The bill draw-out preventing mechanism 110 includes a pusher 111 on one end side (in an erected section at one end) of a rectangular center portion 113 and includes a key-like hook 112 on the other end side (in an erected section at the other end) of the center portion 113. In the bill draw-out preventing mechanism 110, the center portion 113, the pusher 111, and the hook 112 are integrally formed.

The coin draw-out preventing mechanism 120 is formed in a substantially C shape by a material such as metal, plastic, or resin. The coin draw-out preventing mechanism 120 includes a hook 122 on one end side (in an erected section at one end) of a rectangular center portion 123 and includes a key-like pusher 121 on the other end side (in an erected section at the other end) of the center portion 123. In the coin draw-out preventing mechanism 120, the center portion 123, the pusher 121, and the hook 122 are integrally formed.

The base 130 includes a pair of first erected pieces 131 formed in parallel on one end side and includes a pair of second erected pieces 132 formed in parallel on the other end side. Both ends of a substantially columnar shaft 141 are inserted between the pair of first erected pieces 131. The shaft 141 is attached to the base 130. A coil spring 142 is provided on the outer circumference of the shaft 141. Both ends of a substantially columnar shaft 143 are inserted between the pair of second erected pieces 132. The shaft 143 is attached to the base 130. A coil spring 144 is provided on the outer circumference of the shaft 143. The shaft 141 and the shaft 143 are coaxially attached to the base 130.

One end side (the pusher 111 side) of the bill draw-out preventing mechanism 110 and one end side (the hook 122 side) of the coin draw-out preventing mechanism 120 are axially supported on the base 130 by the shaft 143 attached to the base 130. The pusher 111 and the hook 122, which are axially supported, are disposed in positions adjacent to each other. The other end side (the hook 112 side) of the bill draw-out preventing mechanism 110 and the other end side (the pusher 121 side) of the coin draw-out preventing mechanism 120 are axially supported on the base 130 by the shaft 141 attached to the base 130. The pusher 121 and the hook 112, which are axially supported, are disposed in positions adjacent to each other. The bill draw-out preventing mechanism 110 and the coin draw-out preventing mechanism 120 are turnably axially supported by the shaft 141 and the 143, which are coaxially provided, respectively independently from each other.

Figure 6:
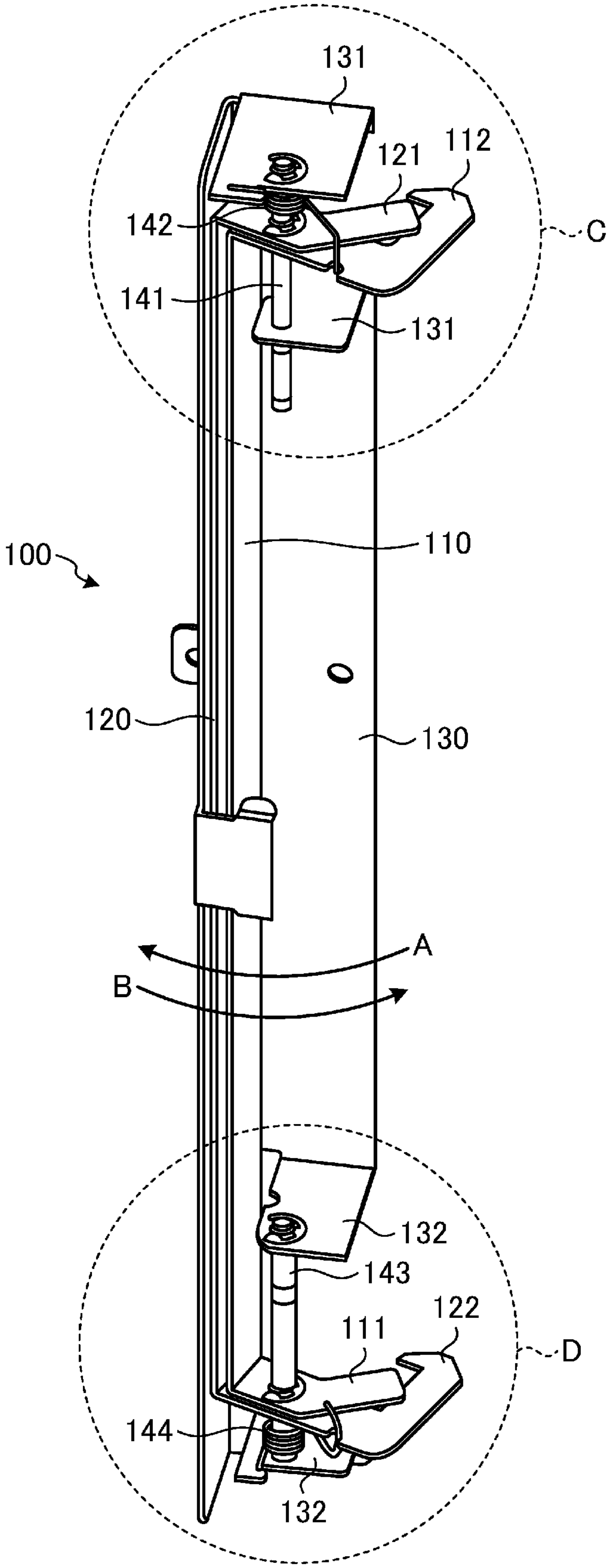
FIG. 6 is a diagram illustrating a configuration of the lock mechanism.

FIG. 6 is a diagram illustrating a configuration of the lock mechanism 100 in a state in which the bill draw-out preventing mechanism 110 and the coin draw-out preventing mechanism 120 are axially supported on (attached to) the base 130. In FIG. 6, the bill draw-out preventing mechanism 110 is capable of turning in an arrow A direction (a clockwise direction in FIG. 6) and an arrow B direction (a counterclockwise direction in FIG. 6) with the shaft 141 and the shaft 143 as fulcrums. The bill draw-out preventing mechanism 110 is urged to turn in the arrow B direction by the coil spring 142. The coin draw-out preventing mechanism 120 is capable of turning in the arrow A direction and the arrow B direction with the shaft 141 and the shaft 143 as fulcrums. The coin draw-out preventing mechanism 120 is urged to turn in the arrow B direction by the coil spring 144.

As explained in detail below, if the bill draw-out preventing mechanism 110 is turning in the arrow A direction, the hook 112 is separated from the bill change machine 3 (is in an unlock state). The lock mechanism 100 (specifically, the bill draw-out preventing mechanism 110) is not inhibiting the bill change machine 3 from moving in the drawing-out direction (that is, the lock mechanism 100 is not locking the bill change machine 3 to be unable to be drawn out). On the other hand, if the bill draw-out preventing mechanism 110 is turning in the arrow B direction with an urging force of the coil spring 142, the hook 112 is locked to the bill change machine 3 (is in a lock state). The lock mechanism 100 (specifically, the bill draw-out preventing mechanism 110) is inhibiting the bill change machine 3 from moving in the drawing-out direction (that is, the lock mechanism 100 is locking the bill change machine 3 to be unable to be drawn out).

If the coin draw-out preventing mechanism 120 is turning in the arrow A direction, the hook 122 is separated from the coin change machine 4 (is in an unlock state). The lock mechanism 100 (specifically, the coin draw-out preventing mechanism 120) is not inhibiting the coin change machine 4 from moving in the drawing-out direction (that is, the lock mechanism 100 is not locking the coin change machine 4 to be unable to be drawn out). On the other hand, if the coin draw-out preventing mechanism 120 is turning in the arrow B direction with an urging force of the coil spring 144, the hook 122 is locked to the coin change machine 4 (is in a lock state). The lock mechanism 100 (specifically, the coin draw-out preventing mechanism 120) is inhibiting the coin change machine 4 from moving in the drawing-out direction (that is, the lock mechanism 100 is locking the coin change machine 4 to be unable to be drawn out).

Figure 7:
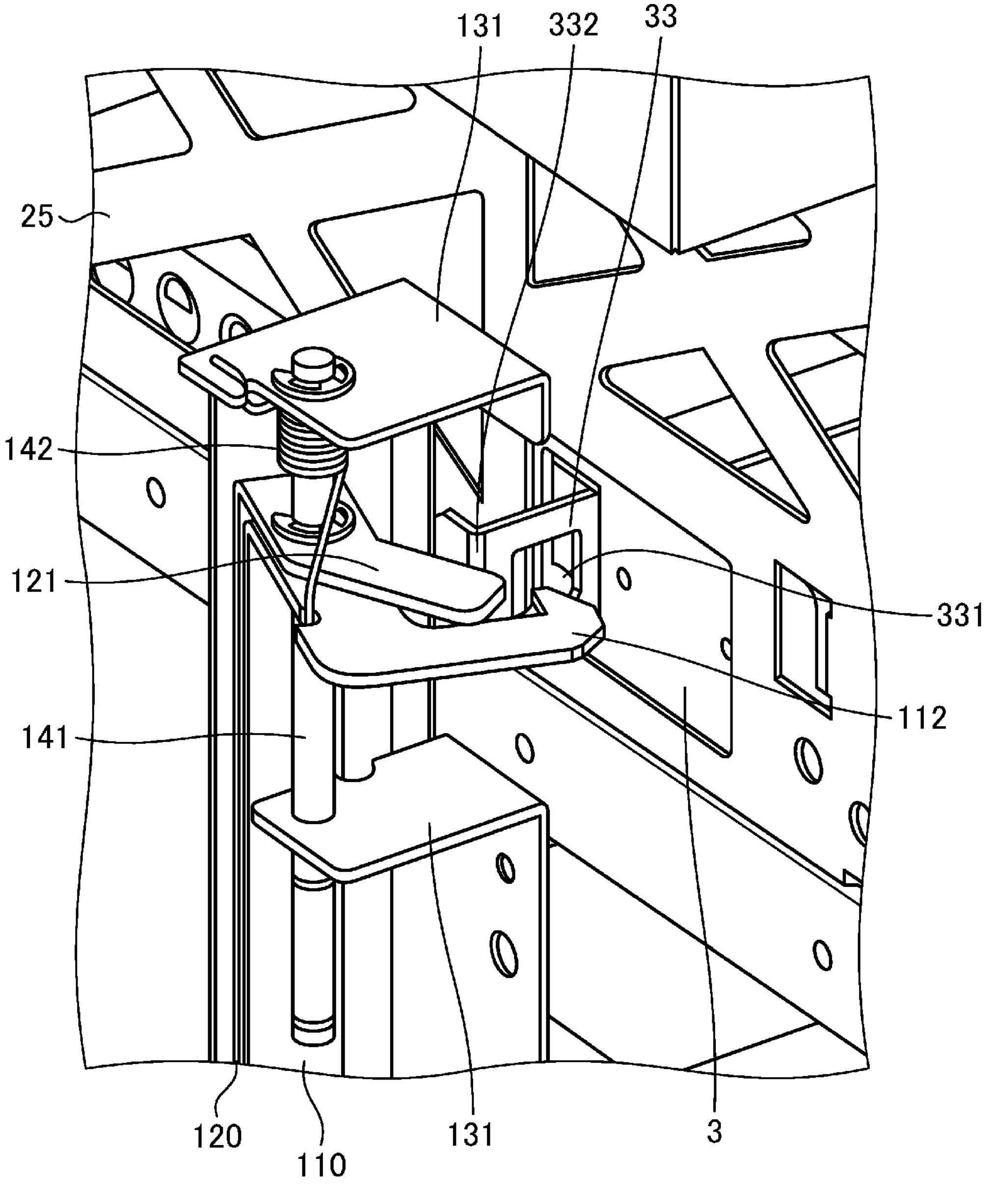
FIG. 7 is an enlarged view of one end portion of the lock mechanism and is a diagram illustrating a component that locks to the bill change machine.
Figure 8:
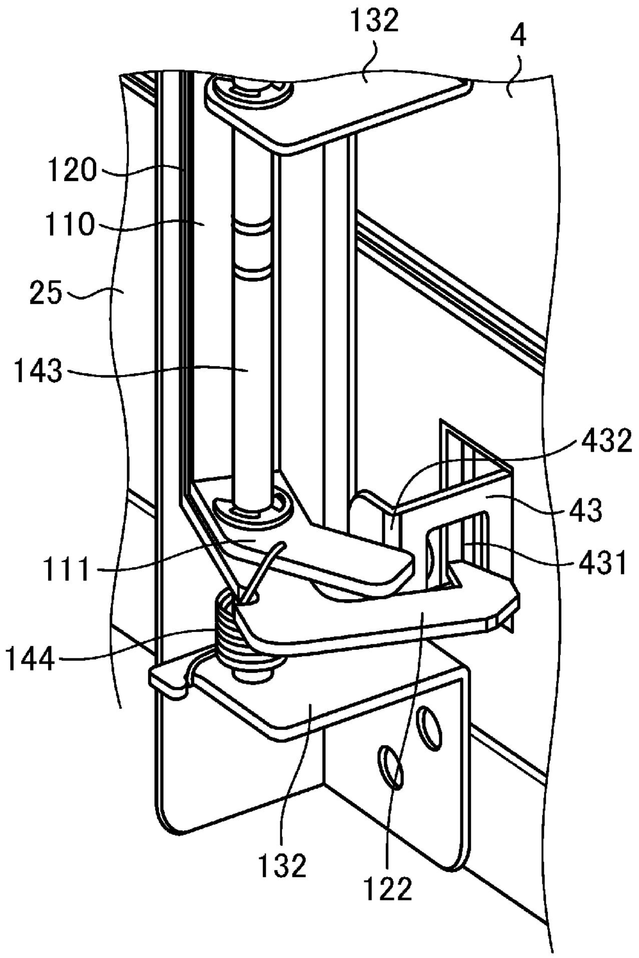
FIG. 8 is an enlarged view of one end portion of the lock mechanism and is a diagram illustrating a component that locks to the coin change machine.

FIG. 7 is an enlarged diagram of a dotted line circle C portion in FIG. 6 in a state in which the lock mechanism 100 is attached to the rear surface section 25 of the checkout apparatus 1 (the state illustrated in FIG. 4). FIG. 8 is an enlarged diagram of a dotted line circle D portion in FIG. 6 in the state in which the lock mechanism 100 is attached to the rear surface section 25 of the checkout apparatus 1 (the state illustrated in FIG. 4).

In FIG. 7, the bill change machine 3 includes a locking piece 33 in the rear surface section thereof. The locking piece 33 includes a hollow open hole section 331. The locking piece 33 projects rearward from the rear surface section 25 if the bill change machine 3 is located in the housing position. In a state in which the bill change machine 3 is located in the housing position, if the bill draw-out preventing mechanism 110 turns in the arrow B direction in FIG. 6 with the shaft 141 and the shaft 143 as fulcrums, the distal end portion of the hook 112 enters the open hole section 331, whereby the hook 112 is locked to the locking piece 33. In this way, the bill draw-out preventing mechanism 110 locks the bill change machine 3 and inhibits the bill change machine 3 from being drawn out (moving) in the drawing-out direction. In the state in which the bill change machine 3 is located in the housing position, if the bill draw-out preventing mechanism 110 turns in the arrow A direction in FIG. 6 with the shaft 141 and the shaft 143 as fulcrums, the distal end portion of the hook 112 entering the open hole section 331 comes off the open hole section 331, whereby the hook 112 and the locking piece 33 are unlocked. In this way, the bill change machine 3 is unlocked from the bill draw-out preventing mechanism 110. The bill change machine 3 can be drawn out (move) in the drawing out direction.

In a process in which the bill change machine 3 is housed in the housing 2, a little before the bill change machine 3 is housed in the housing position, a distal end portion 332 of the locking piece 33 comes into contact with the pusher 121. If the bill change machine 3 is housed in the housing position, the locking piece 33 pushes the pusher 121, whereby the coin draw-out preventing mechanism 120 turns in the arrow A direction in FIG. 6 with the shaft 141 and the shaft 143 as fulcrums. If the bill change machine 3 is drawn out from the housing 2, the contact of the distal end portion 332 of the locking piece 33 and the pusher 121 is released. Then, the coin draw-out preventing mechanism 120 turns, with an urging force of the coil spring 142, in the arrow B direction in FIG. 6 with the shaft 141 and the shaft 143 as fulcrums.

In FIG. 8, the coin change machine 4 includes a locking piece 43 in the rear surface section thereof. The locking piece 43 includes a hollow open hole section 431. The locking piece 43 projects rearward from the rear surface section 25 if the coin change machine 4 is located in the housing section. In a state in which the coin change machine 4 is located in the housing position, if the coin draw-out preventing mechanism 120 turns in the arrow B direction in FIG. 6 with the shaft 141 and the shaft 143 as fulcrums, the distal end portion of the hook 122 enters the open hole section 431, whereby the hook 122 is locked to the locking piece 43. In this way, the coin draw-out preventing mechanism 120 locks the coin change machine 4 and inhibits the coin change machine 4 from being drawn out (moving) in the drawing-out direction. In the state in which the coin change machine 4 is located in the housing position, if the coin draw-out preventing mechanism 120 turns in the arrow A direction in FIG. 6 with the shaft 141 and the shaft 143 as fulcrums, the distal end portion of the hook 122 entering the open hole section 431 comes off the open hole section 431, whereby the hook 122 and the locking piece 43 are unlocked. In this way, the coin change machine 4 is unlocked from the coin draw-out preventing mechanism 120. The coin change machine 4 can be drawn out (move) in the drawing out direction.

In a process in which the coin change machine 4 is housed in the housing 2, a little before the coin change machine 4 is housed in the housing position, a distal end portion 432 of the locking piece 43 comes into contact with the pusher 111. If the coin change machine 4 is housed in the housing position, the locking piece 43 pushes the pusher 111, whereby the bill draw-out preventing mechanism 110 turns in the arrow A direction in FIG. 6 with the shaft 141 and the shaft 143 as fulcrums. If the coin change machine 4 is drawn out from the housing 2, the contact of the distal end portion

432 of the locking piece 43 and the pusher 111 is released. Then, the bill draw-out preventing mechanism 110 turns, with an urging force of the coil spring 144, in the arrow B direction in FIG. 6 with the shaft 141 and the shaft 143 as fulcrums.

Figure 9:
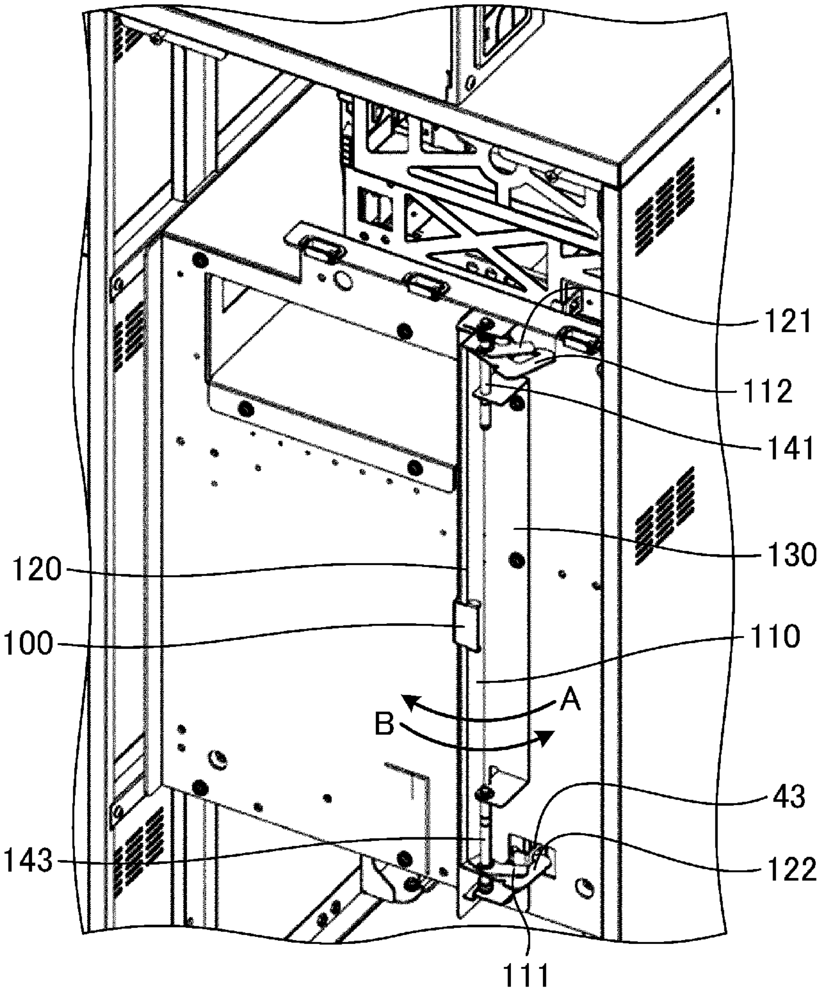
FIG. 9 is a diagram illustrating a locked state of the lock mechanism to the coin change machine in a state in which the bill change machine is drawn out from a housing.

In this way, if the bill change machine 3 is housed in the housing position, since the coin draw-out preventing mechanism 120 turns in the arrow A direction and the hook 122 and the locking piece 43 are unlocked, the coin change machine 4 is unlocked and becomes capable of moving in the drawing-out direction. If the bill change machine 3 is drawn out from the housing position, since the coin draw-out preventing mechanism 120 turns in the arrow B direction and the hook 122 and the locking piece 43 are locked, the coin change machine 4 is locked by the coin draw-out preventing mechanism 120 and inhibited from moving in the drawing-out direction. FIG. 9 is a diagram illustrating a state in which the bill change machine 3 is drawn out from the housing position. As illustrated in FIG. 9, if the bill change machine 3 is drawn out, the coin draw-out preventing mechanism 120 turns in the arrow B direction and the hook 122 locks to the locking piece 43 and locks the coin change machine 4. Therefore, the coin change machine 4 and the bill change machine 3 are not simultaneously drawn out. In the checkout apparatus 1 having such a configuration, since the center of gravity does not greatly move even if only the bill change machine 3 is drawn out, it is possible to reduce a risk of fall-down of the checkout apparatus 1 at a maintenance time or the like.

Figure 10:
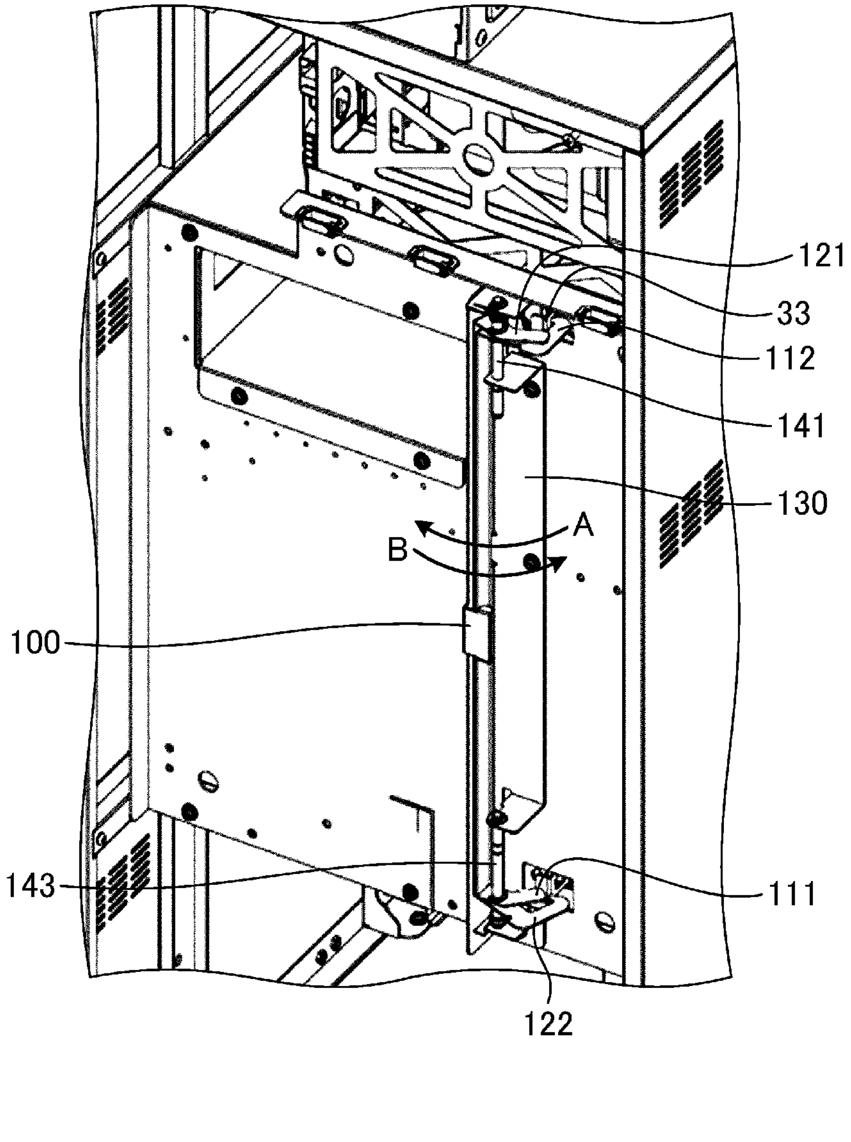
FIG. 10 is a diagram illustrating a locked state of the lock mechanism with the bill change machine in a state in which the coin change machine is drawn out from the housing.

If the coin change machine 4 is housed in the housing position, since the bill draw-out preventing mechanism 110 turns in the arrow A direction and the hook 112 and the locking piece 33 are unlocked, the bill change machine 3 is unlocked and becomes capable of moving in the drawing-out direction. If the coin change machine 4 is drawn out from the housing position, since the bill draw-out preventing mechanism 110 turns in the arrow B direction and the hook 112 and the locking piece 33 are locked, the bill change machine 3 is locked by the bill draw-out preventing mechanism 110 and inhibited from moving in the drawing-out direction. As illustrated in FIG. 10, if the coin change machine 4 is drawn out, the bill draw-out preventing mechanism 110 turns in the arrow B direction and the hook 112 locks to the locking piece 33 and locks the bill change machine 3. Therefore, the coin change machine 4 and the bill change machine 3 are not simultaneously drawn out. In the checkout apparatus 1 having such a configuration, since the center of gravity does not greatly move even if only the coin change machine 4 is drawn out, it is possible to reduce a risk of fall-down of the checkout apparatus 1 at a maintenance time or the like.

Second Embodiment

A second embodiment is explained below. In the first embodiment, the bill change machine 3 and the coin change machine 4 are locked using, as an example of the lock unit, the lock mechanism 100 configured by a mechanical mechanism. However, in the second embodiment, the bill change machine 3 and the coin change machine 4 are locked by control. In the second embodiment, the configurations of the bill change machine 3 and the coin change machine 4 are the same as the configurations in the first embodiment.

Figure 11:
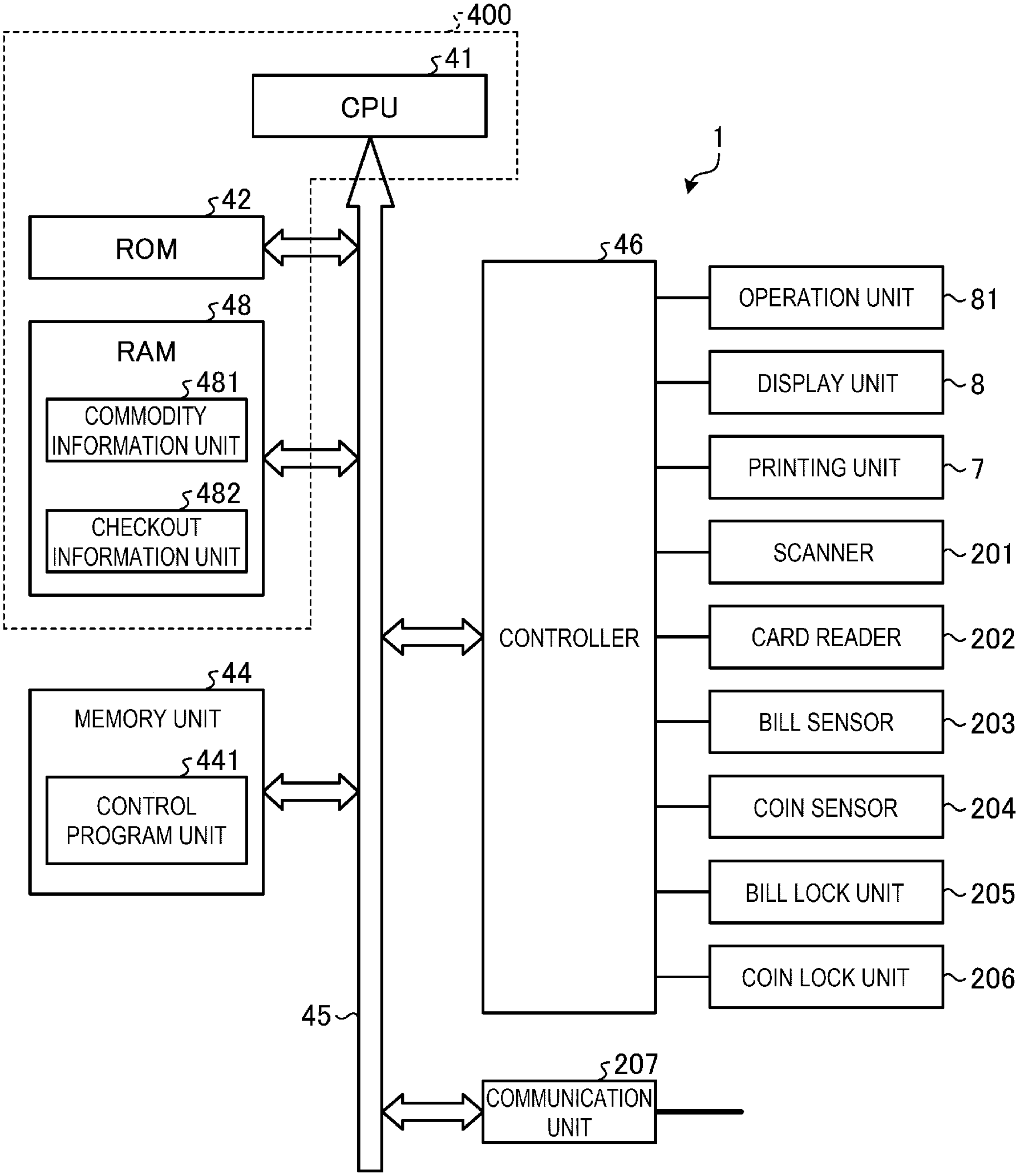
FIG. 11 is a block diagram illustrating a hardware configuration of a checkout apparatus according to a second embodiment.

Subsequently, a hardware configuration of the checkout apparatus 1 according to the second embodiment is explained. FIG. 11 is a block diagram illustrating the hardware configuration of the checkout apparatus 1. As illustrated in FIG. 11, the checkout apparatus 1 includes a CPU (Central Processing Unit) 41, a ROM (Read Only Memory) 42, a RAM (Random Access Memory) 48, and a memory unit 44. The CPU 41 is a control entity of the checkout apparatus 1. The ROM 42 stores various programs. Programs and various data are loaded in the RAM 48. The memory unit 44 stores various programs. The CPU 41, the ROM 42, the RAM 48, and the memory unit 44 are connected to one another via a bus 45. The CPU 41, the ROM 42, and the RAM 48 configure a control unit 400. That is, the CPU 41 operates according to a control program stored in the ROM 42 and the memory unit 44 and loaded in the RAM 48, whereby the control unit 400 executes control processing for the checkout apparatus 1 explained below.

The RAM 48 includes a commodity information unit 481 and a checkout information unit 482. The commodity information unit 481 receives, from a commodity registration apparatus, commodity information of a commodity (a commodity name, a price of the commodity, and the like) subjected to commodity registration processing by the commodity registration apparatus and stores the commodity information. The checkout information unit 482 stores commodity information and checkout information of a commodity subjected to checkout processing based on the commodity information stored in the commodity information unit 481.

The memory unit 44 is configured by a nonvolatile memory such as a HDD (Hard Disc Drive) or a flash memory in which stored information is maintained even if power is turned off. The memory unit 44 includes a control program unit 441 that stores a control program.

The control unit 400 is connected to the operation unit 81, the display unit 8, the printing unit 7, a scanner 201, a card reader 202, a bill sensor 203, a coin sensor 204, a bill lock unit 205, and a coin lock unit 206 via the bus 45 and a controller 46.

The operation unit 81 is a touch panel provided on the display unit 8 and configures a keyboard. The display unit 8 is, for example, a liquid crystal display and displays commodity information of a commodity subjected to commodity registration processing, checkout information subjected to checkout processing, and the like. The printing unit 7 dispenses a receipt on which the commodity information, the checkout information, and the like are printed. The scanner 201 reads a code symbol (a barcode or a two-dimensional code) for invoking commodity information relating to an individual transaction to the checkout apparatus 1, the code symbol being printed and issued by, for example, the commodity registration apparatus. The card reader 202 reads information from, for example, a credit card for performing settlement processing.

The bill sensor 203 is, for example, an optical sensor or a mechanical sensor and is a sensor that detects that the bill change machine 3 was drawn out from the housing position. If the bill change machine 3 was drawn out from the housing position by a predetermined distance (for example, several centimeters), the bill sensor 203 detects that the bill change machine 3 was drawn out from the housing position. The bill sensor 203 is a sensor that detects that the bill change machine 3 was housed in the housing position.

The coin sensor 204 is, for example, an optical sensor or a mechanical sensor and is a sensor that detects that the coin change machine 4 was drawn out from the housing position. If the coin change machine 4 was drawn out from the housing position by a predetermined distance (for example, several centimeters), the coin sensor 204 detects that the coin change machine 4 was drawn out from the housing position. The coin sensor 204 is a sensor that detects that the coin change machine 4 was housed in the housing position.

The bill lock unit 205 includes, for example, the hook 112 and a solenoid that causes the hook 112 to enter the open hole section 331 in order to lock the hook 112 to the locking piece 33 and draws out the entering hook 112 from the open hole section 331 in order to unlock the hook 112 and the locking piece 33. The bill lock unit 205 locks the bill change machine 3 not to be drawn out from the housing position in a state in which the hook 112 is locked to the locking piece 33.

The coin lock unit 206 includes, for example, the hook 122 and a solenoid that causes the hook 122 to enter the open hole section 431 in order to lock the hook 122 to the locking piece 43 and draws out the entering hook 122 from the open hole section 431 in order to unlock the hook 122 and the locking piece 43. The coin lock unit 206 locks the coin change machine 4 not to be drawn out from the housing position in a state in which the hook 122 is locked to the locking piece 43.

The controller 46 receives an instruction from the control unit 400 and controls the operation unit 81, the display unit 8, the printing unit 7, the scanner 201, the card reader 202, the bill sensor 203, the coin sensor 204, the bill lock unit 205, and the coin lock unit 206. However, for convenience of explanation, in the following explanation, it is assumed that the control unit 400 performs the control performed by the controller 46.

The control unit 400 is connected to the communication unit 207 via the bus 45. The communication unit 207 is electrically connected to the commodity registration apparatus via a communication line and transmits and receives information to and from the commodity registration apparatus.

Figure 12:
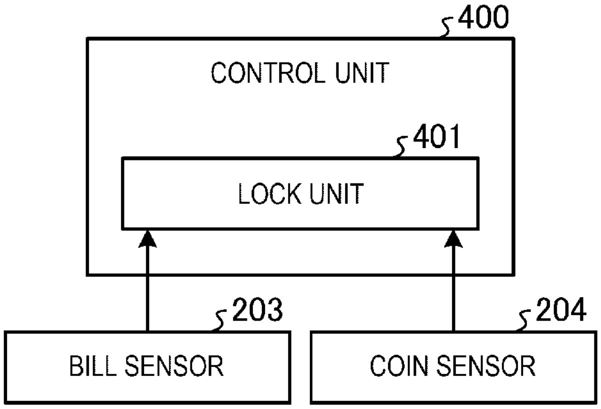
FIG. 12 is a functional block diagram illustrating a functional configuration of the checkout apparatus.

A functional configuration of the checkout apparatus 1 according to the second embodiment is explained. FIG. 12 is a block diagram illustrating the functional configuration of the checkout apparatus 1. The control unit 400 follows a control program stored in the ROM 42 and the control program unit 441 of the memory 44 to function as a lock unit 401.

The lock unit 401 has a function of locking the coin change machine 4 to be unable to be drawn out if the bill change machine 3 was drawn out and locking the bill change machine 3 to be unable to be drawn out if the coin change machine 4 was drawn out. Specifically, the lock unit 401 has a function of, if receiving, from the bill sensor 203, a signal indicating that the bill sensor 203 detected that the bill change machine 3 was drawn out, driving the coin lock unit 206 (locking the hook 122 to the locking piece 43) and locking the coin change machine 4 to be unable to be drawn out and, if receiving, from the coin sensor 204, a signal indicating that the coin sensor 204 detected that the coin change machine 4 was drawn out, driving the bill lock unit 205 (locking the hook 112 to the locking piece 33) and locking the bill change machine 3 to be unable to be drawn out.

Figure 13:
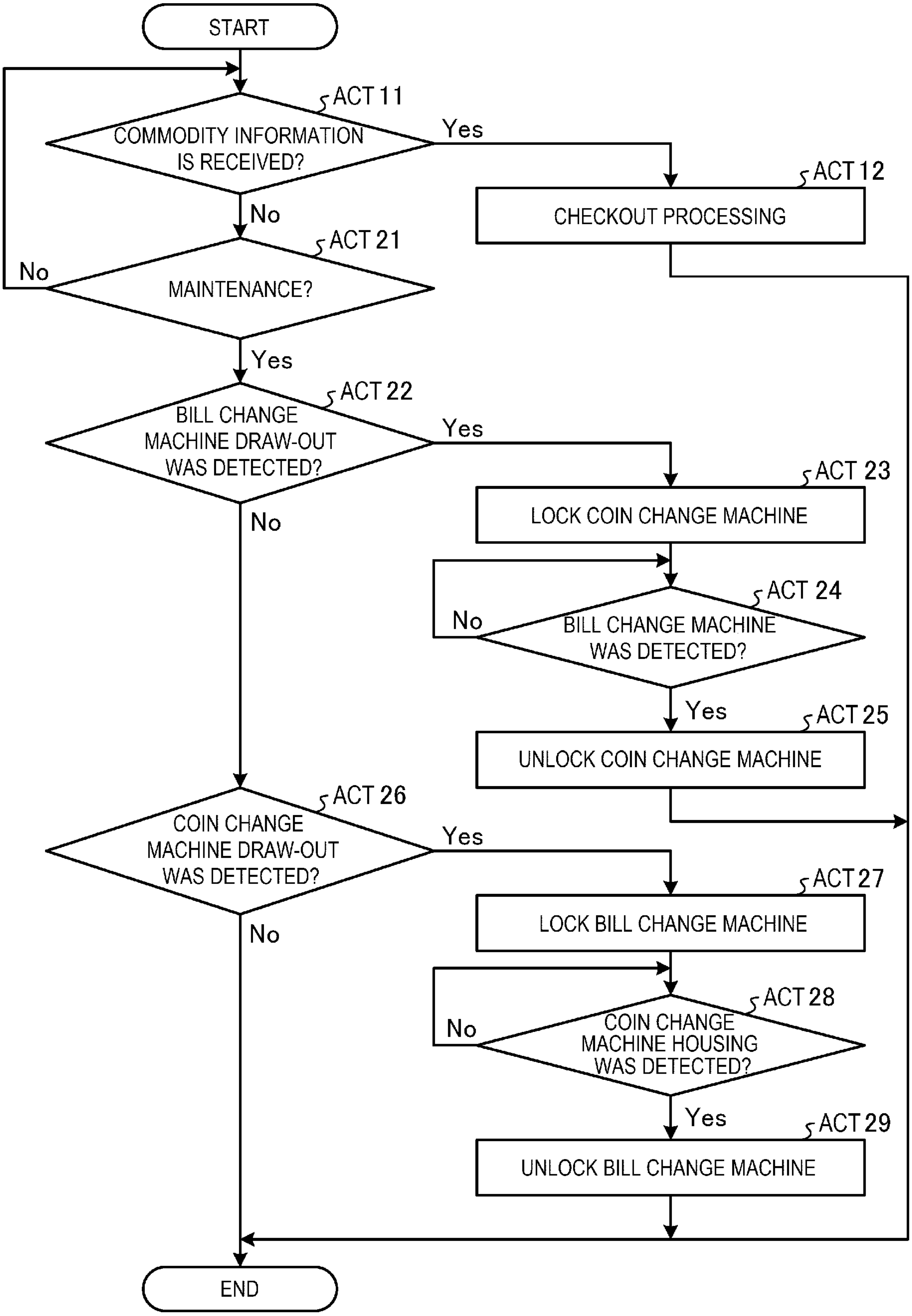
FIG. 13 is a flowchart illustrating a flow of control processing for the checkout apparatus.

Subsequently, control of the checkout apparatus 1 is explained. FIG. 13 is a flowchart illustrating a flow of control processing of the checkout apparatus 1. As illustrated in FIG. 13, the control unit 400 of the checkout apparatus 1 determines whether commodity information received from the commodity registration apparatus is stored in the commodity information unit 481 (Act 11). If determining that commodity information was received from the commodity registration apparatus (Yes in Act 11), the control unit 400 executes checkout processing based on the received commodity information (Act 12). The control unit 400 stores commodity information and checkout information of a commodity subjected to the checkout processing in the checkout information unit 482 (Act 12). The control unit 400 ends the processing and returns to Act 11.

If determining that commodity information was not received from the commodity registration apparatus (No in Act 11), the control unit 400 determines whether maintenance of the checkout apparatus 1 is performed (Act 21). For example, if receiving an instruction for maintenance from a host apparatus of the checkout apparatus 1, the control unit 400 determines that maintenance is performed. If determining that maintenance is not performed (No in Act 21), the control unit 400 returns to Act 11.

On the other hand, if determining that maintenance is performed (Yes in Act 21), the control unit 400 determines whether the bill sensor 203 detected that the bill change machine 3 was drawn out (Act 22). If the control unit 400 determines that the bill sensor 203 detected that the bill change machine 3 was drawn out (Yes in Act 22), the lock unit 401 drives the coin lock unit 206 and locks the coin change machine 4 to be unable to be drawn out (Act 23).

Subsequently, the control unit 400 determines whether the bill sensor 203 detected that the bill change machine 3 was housed in the housing position (Act 24). The control unit 400 stays on standby until the bill sensor 203 detects that the bill change machine 3 was housed in the housing position. If determining that the bill sensor 203 detected that the bill change machine 3 was housed in the housing position (Yes in Act 24), the control unit 400 releases the driving of the coin lock unit 206 (unlocks the hook 122 and the locking piece 43) and unlocks the coin change machine 4 (Act 25). The control unit 400 ends the processing and returns to Act 11.

If determining that the bill sensor 203 did not detect that the bill change machine 3 was drawn out (No in Act 22), the control unit 400 determines whether the coin sensor 204 detected that the coin change machine 4 was drawn out (Act 26). If the control unit 400 determines that the coin sensor 204 detected that the coin change machine 4 was drawn out (Yes in Act 26), the lock unit 401 drives the bill lock unit 205 and locks the bill change machine 3 to be unable to be drawn out (Act 27).

Subsequently, the control unit 400 determines whether the coin sensor 204 detected that the coin change machine 4 was housed in the housing position (Act 28). The control unit 400 stays on standby until the coin sensor 204 detects that the coin change machine 4 was housed in the housing position. If determining that the coin sensor 204 detected that the coin change machine 4 was housed in the housing position (Yes in Act 28), the control unit 400 releases the driving of the bill lock unit 205 (unlocks the hook 112 and the locking piece 33) and unlocks the bill change machine 3 (Act 29). The control unit 400 ends the processing and returns to Act 11.

In this way, in the checkout apparatus 1 in the second embodiment, if the bill change machine 3 was drawn out, the lock unit 401 locks the coin change machine 4 not to be drawn out. In the checkout apparatus 1 having such a configuration, since the center of gravity does not greatly move even if only the bill change machine 3 is drawn out, it is possible to reduce a risk of fall-down of the checkout apparatus 1 at a maintenance time or the like. If the coin change machine 4 was drawn out, the lock unit 401 locks the bill change machine 3 not to be drawn out. In the checkout apparatus 1 having such a configuration, since the center of gravity does not greatly move even if only the coin change machine 4 is drawn out, it is possible to reduce a risk of fall-down of the checkout apparatus 1 at a maintenance time or the like.

As explained above, the checkout apparatus 1 in the first embodiment and the second embodiment includes the housing 2, the bill change machine 3 provided on the inside of the housing 2 and housed to be capable of being drawn out from the housing 2, the coin change machine 4 provided on the inside of the housing 2 and housed to be capable of being drawn out from the housing 2 in the same direction as a direction in which the bill change machine 3 is drawn out, and the lock unit that, if the bill change machine 3 was drawn out, locks the coin change machine 4 to be unable to be drawn out and, if the coin change machine 4 was drawn out, locks the bill change machine 3 to be unable to be drawn out.

In such a checkout apparatus 1, since the bill change machine 3 and the coin change machine 4 are not simultaneously drawn out, it is possible to reduce a risk of fall-down of the checkout apparatus 1 at a maintenance time or the like.

While the embodiments are explained above, these embodiments are presented as examples and are not intended to limit the scope of invention. These new embodiments can be implemented in other various forms. Various omissions, substitutions, and changes can be made in a range not departing from the gist of the invention. These embodiments and modifications thereof are included in the scope and the gist of the invention and included in the inventions described in the claims and a scope of equivalents of the inventions.

For example, in the embodiments, the coin change machine 4 is disposed on the lower side and the bill change machine 3 is disposed on the upper side. However, not only this, but the bill change machine 3 may be disposed on the lower side and the coin change machine 4 may be disposed on the upper side.

In the embodiments, the bill change machine 3 and the coin change machine 4 are disposed in the up-down direction. However, not only this, but the bill change machine 3 and the coin change machine 4 may be disposed side by side in the lateral direction.

In the embodiments, the checkout apparatus used in the semi-self-service type checkout apparatus is explained as an example. However, not only this, but the checkout apparatus may be a self-service type checkout apparatus.

What is claimed is:

1. A checkout apparatus comprising:
- a housing;
- a bill change machine provided on an inside of the housing and configured to be drawn out from the housing;
- a coin change machine provided on the inside of the housing and configured to be drawn out from the housing in a same direction as a direction in which the bill change machine is drawn out; and
- a lock component configured to, if the bill change machine is drawn out, lock the coin change machine so as to be unable to be drawn out, and if the coin change machine is drawn out, lock the bill change machine so as to be unable to be drawn out,
- wherein the lock component includes a coin draw-out preventing mechanism configured to inhibit the coin change machine from being drawn out if the bill change machine is drawn out and a bill draw-out preventing mechanism configured to inhibit the bill change machine from being drawn out if the coin change machine is drawn out, wherein
- the coin draw-out preventing mechanism integrally includes a bill pusher that comes into contact with the housed bill change machine and a coin hook, the contact of the bill pusher and the bill change machine is released and the coin draw-out preventing mechanism rotates if the bill change machine is drawn out, and the coin hook locks to the coin change machine and locks the coin change machine to be unable to be drawn out, and
- the bill draw-out preventing mechanism integrally includes a coin pusher that comes into contact with the housed coin change machine and a bill hook, the contact of the coin pusher and the coin change machine is released and the bill draw-out preventing mechanism rotates if the coin change machine is drawn out, and the bill hook locks to the bill change machine and locks the bill change machine to be unable to be drawn out.

2. The checkout apparatus according to claim 1, wherein both of the coin draw-out preventing mechanism and the bill draw-out preventing mechanism turn on a same axis in a state in which the coin draw-out preventing mechanism and the bill draw-out preventing mechanism are attached to a base of the housing.

3. The checkout apparatus according to claim 2, wherein the coin draw-out preventing mechanism turns with an urging force of a spring if the bill change machine is drawn out, and the bill draw-out preventing mechanism turns with an urging force of a spring if the coin change machine is drawn out.

4. The checkout apparatus according to claim 1, wherein the bill change machine has a front side operated by a customer and is further configured to be drawn out from the housing to a rear side opposite the front side.

5. The checkout apparatus according to claim 1, wherein the coin change machine has a front side operated by a customer and is further configured to be drawn out from the housing to a rear side opposite the front side.

6. A method for a checkout apparatus, comprising:
- drawing out a bill change machine from an inside of a housing of the checkout apparatus;
- drawing out a coin change machine from the inside of the housing in a same direction as a direction in which the bill change machine is drawn out;
- if the bill change machine is drawn out, locking the coin change machine with a lock component so that the coin change machine is unable to be drawn out; and
- if the coin change machine is drawn out, locking the bill change machine with the lock component so that the bill change machine is unable to be drawn out,
- the method further comprising:
- inhibiting the coin change machine from being drawn out with a coin draw-out preventing mechanism if the bill change machine is drawn out; and
- inhibiting the bill change machine from being drawn out with a bill draw-out preventing mechanism if the coin change machine is drawn out, wherein
- the coin draw-out preventing mechanism integrally includes a bill pusher that comes into contact with the housed bill change machine and a coin hook, the contact of the bill pusher and the bill change machine is released and the coin draw-out preventing mechanism rotates if the bill change machine is drawn out, and the coin hook locks to the coin change machine and locks the coin change machine to be unable to be drawn out, and
- the bill draw-out preventing mechanism integrally includes a coin pusher that comes into contact with the housed coin change machine and a bill hook, the contact of the coin pusher and the coin change machine is released and the bill draw-out preventing mechanism rotates if the coin change machine is drawn out, and the bill hook locks to the bill change machine and locks the bill change machine to be unable to be drawn out.

7. The method according to claim 6, wherein both of the coin draw-out preventing mechanism and the bill draw-out preventing mechanism turn on a same axis in a state in which the coin draw-out preventing mechanism and the bill draw-out preventing mechanism are attached to a base of the housing.

8. The method according to claim 7, wherein the coin draw-out preventing mechanism turns with an urging force of a spring if the bill change machine is drawn out, and the bill draw-out preventing mechanism turns with an urging force of a spring if the coin change machine is drawn out.

9. The method according to claim 6, wherein the coin change machine has a front side operated by a customer, further comprising:

drawing out the coin change machine from the housing to a rear side opposite the front side.

10. A semi-self-service point of sales terminal, comprising:

a commodity registration apparatus configured to execute commodity registration processing for a commodity; and a payment processing component, comprising:

a bill change machine provided on an inside of a housing and configured to be drawn out from the housing;

a coin change machine provided on the inside of the housing and configured to be drawn out from the housing in a same direction as a direction in which the bill change machine is drawn out; and a lock component configured to, if the bill change machine is drawn out, lock the coin change machine so as to be unable to be drawn out, and if the coin change machine is drawn out, lock the bill change machine so as to be unable to be drawn out, wherein the lock component includes a coin draw-out preventing mechanism configured to inhibit the coin change machine from being drawn out if the bill change machine is drawn out and a bill draw-out preventing mechanism configured to inhibit the bill change machine from being drawn out if the coin change machine is drawn out, and wherein the coin draw-out preventing mechanism integrally includes a bill pusher that comes into contact with the housed bill change machine and a coin hook, the contact of the bill pusher and the bill change machine is released and the coin draw-out preventing mechanism rotates if the bill change machine is drawn out, and the coin hook locks to the coin change machine and locks the coin change machine to be unable to be drawn out, and the bill draw-out preventing mechanism integrally includes a coin pusher that comes into contact with the housed coin change machine and a bill hook, the contact of the coin pusher and the coin change machine is released and the bill draw-out preventing mechanism rotates if the coin change machine is drawn out, and the bill hook locks to the bill change machine and locks the bill change machine to be unable to be drawn out.

11. The semi-self-service point of sales terminal according to claim 10, wherein both of the coin draw-out preventing mechanism and the bill draw-out preventing mechanism turn on a same axis in a state in which the coin draw-out preventing mechanism and the bill draw-out preventing mechanism are attached to a base of the housing.

12. The semi-self-service point of sales terminal according to claim 11, wherein the coin draw-out preventing mechanism turns with an urging force of a spring if the bill change machine is drawn out, and the bill draw-out preventing mechanism turns with an urging force of a spring if the coin change machine is drawn out.

13. The semi-self-service point of sales terminal according to claim 10, wherein the bill change machine has a front side operated by a customer and is further configured to be drawn out from the housing to a rear side opposite the front side.

14. The semi-self-service point of sales terminal according to claim 10, wherein the coin change machine has a front side operated by a customer and is further configured to be drawn out from the housing to a rear side opposite the front side.

* * * * *